US012080532B2

(12) United States Patent
Chaudhary et al.

(10) Patent No.: US 12,080,532 B2
(45) Date of Patent: Sep. 3, 2024

(54) DEVICES AND METHODS FOR LASER-ASSISTED MICRO MASS SPECTROSCOPY

(71) Applicant: Chemring Sensors and Electronic Systems, Inc., Dulles, VA (US)

(72) Inventors: Ashish Chaudhary, Safety Harbor, FL (US); R. Timothy Short, St. Petersburg, FL (US)

(73) Assignee: CHEMRING SENSORS AND ELECTRONIC SYSTEMS, INC., Dulles, VA (US)

( * ) Notice: Subject to any disclaimer, the term of this patent is extended or adjusted under 35 U.S.C. 154(b) by 0 days.

(21) Appl. No.: 17/853,917

(22) Filed: Jun. 30, 2022

(65) Prior Publication Data

US 2023/0012777 A1 Jan. 19, 2023

Related U.S. Application Data

(60) Provisional application No. 63/217,168, filed on Jun. 30, 2021.

(51) Int. Cl.
*H01J 49/00* (2006.01)
*H01J 49/04* (2006.01)
*H01J 49/16* (2006.01)

(52) U.S. Cl.
CPC ...... *H01J 49/0018* (2013.01); *H01J 49/0495* (2013.01); *H01J 49/161* (2013.01)

(58) Field of Classification Search
CPC ... H01J 49/0018; H01J 49/0495; H01J 49/161
USPC .................................. 250/281, 282, 283, 288
See application file for complete search history.

(56) References Cited

U.S. PATENT DOCUMENTS

2020/0015717 A1* 1/2020 Taghioskoui ......... H01J 49/107

OTHER PUBLICATIONS

Altwegg, K., et al. "Prebiotic chemicals—amino acid and phosphorus—in the coma of comet 67P/Churyumov-Gerasimenko." Science Advances 2, e1600285 (2016) (5 pages total).
Arevalo, R., et al. "Design and demonstration of the Mars Organic Molecule Analyzer (MOMA) on the ExoMars 2018 Rover." IEEE Aerospace Conference (2015) (11 pages total).
Bockelée-Morvan, D., et al. "The Composition of Cometary Volatiles," Comets II (ed. M. C. Festou, H. U. Keller, H. A. Weaver), University of Arizona Press: Tucson, pp. 391-423 (2004) (33 pages total).
Brownlee, D. "The Stardust Mission: Analyzing Samples from the Edge of the Solar System." Annual Review of Earth and Planetary Sciences 42, pp. 179-205 (2014) (27 pages total).
Canup, R.M., et al. "Formation of the Galilean Satellites: Conditions of Accretion." The Astronomical Journal 124, pp. 3404-3423 (2002) (20 pages total).

(Continued)

*Primary Examiner* — Nicole M Ippolito
(74) *Attorney, Agent, or Firm* — Boyle PLLC, Patent & Technology Law

(57) ABSTRACT

Systems and methods disclosed provide a laser-assisted micro-mass spectrometer, which can include a pulsed inlet, a multi-wavelength laser system, and a first mass spectrometer module including a plurality of first ionization sources. In an embodiment, the pulsed inlet can be configured to receive a neutral sample of analyte material and provide it to said first mass spectrometer module.

20 Claims, 11 Drawing Sheets

(56) References Cited

OTHER PUBLICATIONS

Capaccioni, F., et al. "The organic-rich surface of comet 67P/Churyumov-Gerasimenko as seen by VIRTIS/Rosetta." Science 347:6220 (2015) (https://doi.org/10.1126/science.aaa0628) (4 pages total).
Carazzetti, P., et al. "Experimental study of electrical breakdown in MEMS devices with micrometer scale gaps." Proceedings of SPIE 6884 (2008) (11 pages total).
Chaudhary, A., et al. "Fabrication and testing of a miniature cylindrical ion trap mass spectrometer constructed from low temperature co-fired ceramics." International Journal of Mass Spectrometry 251, pp. 32-39 (2006) (8 pages total).
Chaudhary, A., et al. "Development of Microfabricated Cylindrical Ion Trap Mass Spectrometer Arrays." Journal of Microelectromechanical Systems, 18:2, pp. 442-448 (2009) (7 pages total).
Chaudhary, A., et al. "Experimental evaluation of micro-ion trap mass spectrometer geometries." International Journal of Mass Spectrometry 371, pp. 17-27, (2014) (11 pages total).
Chaudhary, A., et al. "A novel planar ion funnel design for miniature ion optics." Review of Scientific Instruments 85, p. 105101, (2014) (5 pages total).
Chyba, C.F. et al. "Possible ecosystems and the search for life on Europa." Proceedings of the National Academy of Sciences 98:3, pp. 801-804 (2001) (4 pages total).
Collins, G.C. (Ed.) et al. "Ganymede science questions and future exploration." Planetary Science Decadal Survey Community White Paper (2010) (8 pages total).
Conrad, P.G. "Scratching the surface of martian habitability." Science 346:6215, pp. 1288-1289 (2014) (2 pages total).
Dalton, J. B., et al. "Chemical Composition of Icy Satellite Surfaces." Space Science Reviews 153, pp. 113-154 (2010). doi:10.1007/s11214-010-9665-8 (42 pages total).
El-Habachi, A. et al., "Generation of intense excimer radiation from high-pressure hollow cathode discharges." Applied Physics Letters 73, pp. 885-887 (1998) (3 pages total).
Elsila, J.E., et al. "Cometary glycine detected in samples returned by Stardust." Meteoritics & Planetary Science 44:9, pp. 1323-1330 (2009) (8 pages total).
Eschner, M.S., et al. "Quasi-Simultaneous Acquisition of Hard Electron Ionization and Soft Single-Photon Ionization Mass Spectra during GC/MS Analysis by Rapid Switching between Both Ionization Methods: Analytical Concept, Setup, and Application on Diesel Fuel." Analytical Chemistry 83, pp. 3865-3872 (2011) (8 pages total).
Freissinet, C., et al. "Organic molecules in the Sheepbed Mudstone, Gale Crater, Mars." Journal of Geophysical Research: Planets 120:3, pp. 495-514 (2015) (20 pages total).
Freissinet, C., et al. "Evaluation of the robustness of chromatographic cols. in a simulated highly radiative Jovian environment." Planetary and Space Science 122, pp. 38-45 (2016) (8 pages total).
Hanel, R., et al. "Infrared Observations of the Saturnian System from Voyager 1." Science 212:4491, pp. 192-200 (1981) (9 pages total).
Hussmann, H. et al. "Subsurface oceans and deep interiors of medium-sized outer planet satellites and large trans-neptunian objects." Icarus 185, pp. 258-273 (2006) (16 pages total).
Jakosky, B. M., et al. "Subfreezing Activity of Microorganisms and the Potential Habitability of Mars' Polar Regions." Astrobiology 3:2, pp. 343-350 (2003) (8 pages total).
Kornienko, O., et al. "Micro Ion Trap Mass Spectrometry." Rapid Communications in Mass Spectrometry 13, pp. 50-53 (1999) (4 pages total).
Lammer, H. et al. "What makes a planet habitable?" The Astronomy and Astrophysics Review 17, pp. 181-249 (2009) (69 pages total).
Li, X. et al. "Detection of Trace Organics in Mars Analog Samples Containing Perchlorate by Laser Desorption/Ionization Mass Spectrometry." Astrobiology 15, pp. 104-110 (2015) (7 pages total).
Maguire, W.C., et al. "C3H8 and C3H4 in Titan's atmosphere." Nature 292, pp. 683-686 (1981) (4 pages total).
Matson, D.L., et al. "Enceladus' plume: compositional evidence for a hot interior." Icarus 187, pp. 569-573 (2007) (5 pages total).
Mccord, T.B., et al. "Organics and Other Molecules in the Surfaces of Callisto and Ganymede." Science 278:5336, pp. 271-275 (1997) (5 pages total).
Mckay, D.S., et al. "Search for Past Life on Mars: Possible Relic Biogenic Activity in Martian Meteorite ALH84001." Science 273:5277, pp. 924-930 (1996) (7 pages total).
Mckay, J.L., et al. "Holocene fluctuations in Arctic sea-ice cover: dinocyst-based reconstructions for the eastern Chukchi Sea." Canadian Journal of Earth Sciences 45, pp. 1377-1397 (2008) (21 pages total).
Mühlberger, F., et al. "A Mobile Mass Spectrometer for Comprehensive On-Line Analysis of Trace and Bulk Components of Complex Gas Mixtures: Parallel Application of the Laser-Based Ionization Methods VUV Single-Photon Ionization, Resonant Multiphoton Ionization, and Laser-Induced Electron Impact Ionization." Analytical Chemistry 73, pp. 3590-3604 (2001) (15 pages total).
Mullen, C., et al. "Femtosecond Laser Photoionization Time-of-Flight Mass Spectrometry of Nitro-aromatic Explosives and Explosives Related Compounds." Journal of the American Society for Mass Spectrometry 20, pp. 419-429 (2009) (11 pages total).
Niemann, H.B., et al. "Composition of Titan's lower atmosphere and simple surface volatiles as measured by the Cassini-Huygens probe gas chromatograph mass spectrometer experiment." Journal of Geophysical Research: Planets 115:E12006 (2010) (22 pages total).
Northway, M.J., et al. "Demonstration of a VUV Lamp Photoionization Source for Improved Organic Speciation in an Aerosol Mass Spectrometer." Aerosol Science and Technology 41, pp. 828-839 (2007) (12 pages total).
Pond, B.V., et al. "Detection of explosive-related compounds by laser photoionization time-of-flight mass spectrometry." Applied Physics B 86, pp. 735-742 (2007) (8 pages total).
Rivkina, E.M., et al. "Metabolic Activity of Permafrost Bacteria below the Freezing Point." Applied and Environmental Microbiology 66:8, pp. 3230-3233 (2000) (4 pages total).
Russo, R.E., et al. "Laser ablation in analytical chemistry—a review." Talanta 57, pp. 425-451 (2002) (27 pages total).
Sankaran, R. M., et al. "Argon excimer emission from high-pressure microdischarges in metal capillaries." Applied Physics Letters 83:23, pp. 4728-4730 (2003) (3 pages total).
Schepler, C., et al. "Flow injection of liquid samples to a mass spectrometer with ionization under vacuum conditions: a combined ion source for single-photon and electron impact ionization." Analytical and Bioanalytical Chemistry 405, pp. 6953-6957 (2013) (5 pages total).
Shi, W., et al. "Parallel Operation of Microhollow Cathode Discharges." IEEE Transactions on Plasma Science 27:1 (1999) (2 pages total).
Stafford, G.C., et al. "Recent improvements in and analytical applications of advanced ion trap technology." International Journal of Mass Spectrometry and Ion Processes 60, pp. 85-98 (1984) (14 pages total).
Stoker, C.R., et al. "Habitability of the Phoenix landing site." Journal of Geophysical Research: Planets 115, E00E20 (2010) (24 pages total).
Tian, Y., et al. "How far can ion trap miniaturization go? Parameter scaling and space-charge limits for very small cylindrical ion traps." Journal of Mass Spectrometry, 49, pp. 233-240, 2014 (8 pages total).
Tobie, G., et al. "Science goals and mission concept for the future exploration of Titan and Enceladus." Planetary and Space Science 104, Part A, pp. 59-77 (2014) (19 pages total).
Waite, J.H., et al. "The Process of Tholin Formation in Titan's Upper Atmosphere." Science 316:5826, pp. 870-875 (2007) (6 pages total).
Wu, Q. et al. "Laser desorption lamp ionization source for ion trap mass spectrometry." Journal of Mass Spectrometry 50, pp. 160-164 (2014) (5 pages total).

(56) References Cited

OTHER PUBLICATIONS

Wu, Q., et al. "Minimization of Fragmentation and Aggregation by Laser Desorption Laser Ionization Mass Spectrometry." Journal of the American Society for Mass Spectrometry 24:7, pp. 1116-1122 (2013) (7 pages total).
Xu, W., et al. "Characterization of electrode surface roughness and its impact on ion trap mass analysis." Journal of Mass Spectrometry 44, pp. 353-360 (2009) (8 pages total).
Lieberman, M.A., et I. Principles of Plasma Discharges and Materials Processing, 2nd edition, Hoboken, NJ: John Wiley & Sons, Inc., Table of Contents and Front Matter (pp. v-xix, xxi-xxiii, xxv-xxxi, xxxiii-xxxv) Chapter 14 (pp. 535-569) Appendices, References, Index (pp. 723-729, 731-757) (2005) (100 pages total).

* cited by examiner

DEVICES AND METHODS FOR LASER-ASSISTED MICRO MASS SPECTROSCOPY

CROSS-REFERENCE TO RELATED APPLICATIONS

This application claims the priority and benefit of U.S. Provisional Application No. 63/217,168, filed on Jun. 30, 2021, which is hereby incorporated by reference in its entirety.

FIELD

Materials, components, and methods consistent with the present disclosure are directed to mass spectrometers, and, more particularly, to laser-assisted micro mass spectrometers.

BACKGROUND

There is need to develop a low-power mass spectrometer for chemical detection to facilitate quick decision making in a variety of hazardous and tactical situations. Such applications include interrogation of surfaces, such as performed in security checks at airports, interrogation of suspicious/unknown materials including powers, particulates, liquids and gases. Beyond terrestrial applications, there is also a need for a low power high performance mass spectrometer for planetary and cometary missions for understanding the origin, distribution, and processing of organic compounds in cryogenic planetary environments and is one of the most compelling future directions in solar system research. Such organics are structurally and functionally diverse, despite their low-temperature origins, and are thus thought to constitute an enabling "prebiotic" inventory for the potential emergence of life. Primitive bodies (e.g., comets), polar ice caps (e.g., Mars) and ocean worlds (e.g., Titan) represent examples of cryogenic and potentially organic-rich targets.

SUMMARY

In one aspect, embodiments consistent with the present disclosure include a laser-assisted micro-mass spectrometer, which can include a pulsed inlet, a multi-wavelength laser system, and a first mass spectrometer module including a plurality of first ionization sources. In an embodiment, the pulsed inlet can be configured to receive a neutral sample of analyte material and provide it to said first mass spectrometer module.

In a further aspect, an embodiment consistent with this disclosure can include a laser-assisted micro-mass spectrometer, including a valve associated with a pulsed inlet, a multi-wavelength laser system, and a pulse control. In an embodiment, the multi-wavelength laser system can be configured to generate at least two laser beams, each laser beam being characterized by a respective wavelength. Further, the at least two laser beams, when directed to a target of analyte material, can be configured to generate a neutral sample of analyte material. In a further embodiment. the pulse control can include non-transitory computer readable medium storing instructions that when executed by a control processor cause the control processor to perform a method of acquiring said neutral sample, the method including: opening the valve, closing said valve after at least one of said two laser beams has generated said neutral sample, and after at least a portion of said neutral sample has passed through said pulsed inlet.

In a further embodiment, a method of acquiring a neutral sample for mass spectroscopy can include, selecting a first laser wavelength for generating the neutral sample of analyte from a target, generating the neutral sample of analyte from said target using pulses of the first laser wavelength, opening a valve on an inlet to a first mass spectroscopy module, permitting fluid communication between said generated neutral sample and a region adjacent said first mass spectroscopy module, acquiring at least a portion of said neutral sample in said region adjacent said first mass spectroscopy module through said inlet for analysis by said first mass spectroscopy module, and closing said valve on said inlet.

Additional features and embodiments of the invention will be set forth in part in the description which follows, and in part will be obvious from the description, or may be learned by practice of the invention. It is to be understood that both the foregoing general description and the following detailed description are exemplary and explanatory only and are not restrictive of the claimed subject matter.

BRIEF DESCRIPTION OF THE DRAWINGS

The accompanying drawings, which are incorporated in and constitute a part of this specification, illustrate exemplary embodiments and together with the description, serve to explain the principles of the disclosure. In the figures.

DESCRIPTION OF THE EMBODIMENTS

Reference will now be made in detail to the disclosed embodiments of the disclosure, examples of which are illustrated in the accompanying drawings. Wherever possible, the same reference numbers will be used throughout the drawings to refer to the same or like parts.

Figure 1:
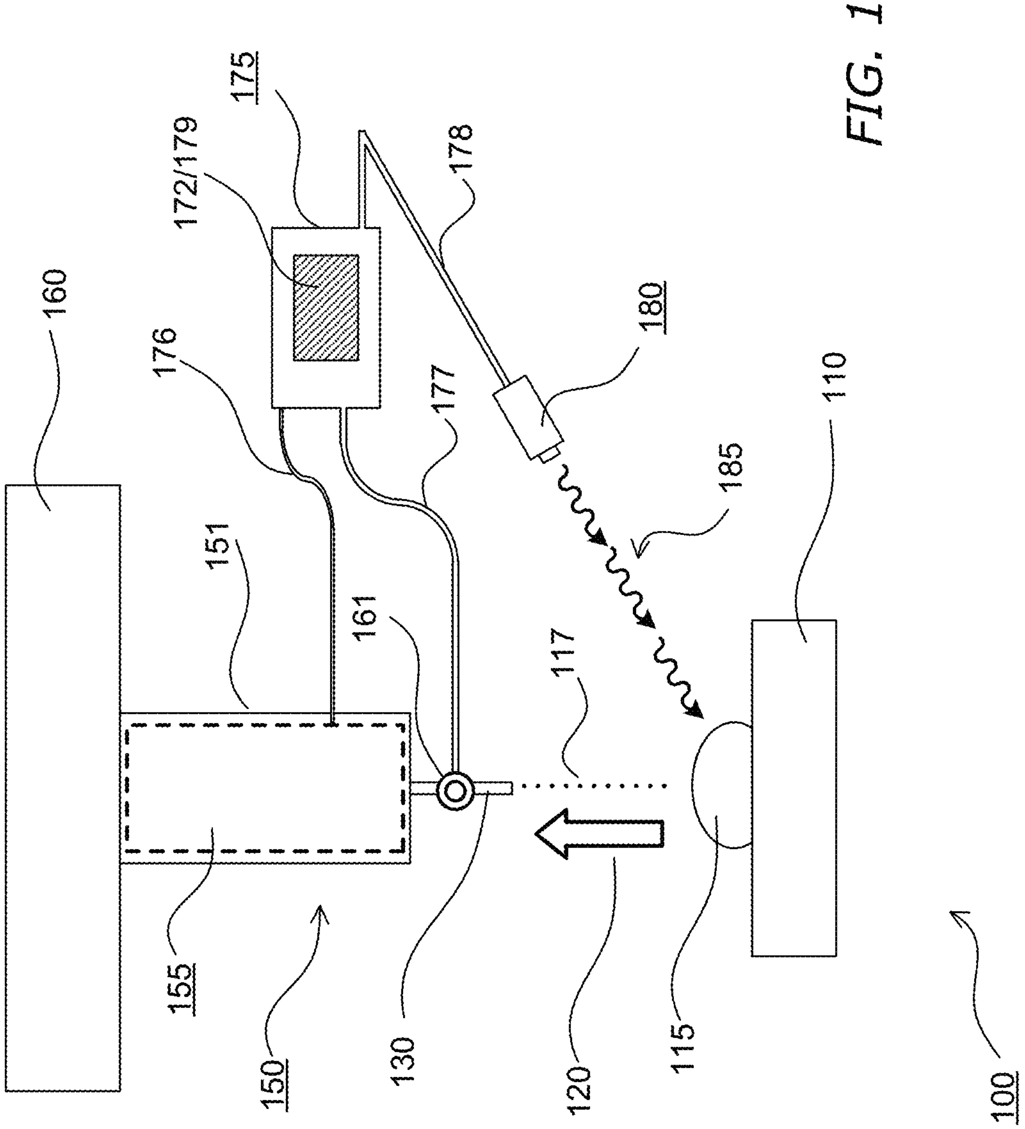
FIG. 1 is an embodiment of a system for laser-assisted, micro-mass spectroscopy consistent with this disclosure.

FIG. 1 is an embodiment of a laser-assisted, micro-mass spectroscopy system 100 consistent with this disclosure. System 100 can include a multi-wavelength laser 180 for laser ablation of sample 115 (where the sample 115 may be found, for example, adhering to material 110, or may be found embedded in material 110). Laser ablation of sample 115 can generate ambient neutrals 117, which can be directed (i.e., in direction 120) to the pulsed inlet 130, and which provides input to dual ionization micro-mass spectrometer 150. Accordingly, system 100 can be configured to combine a multicolored laser ablation front-end with mass spectrometer back-end. In addition to the features discussed expressly below, features of a dual ionization micro-mass spectrometer consistent with this disclosure may be found, for example, in U.S. Pat. No. 9,589,776, entitled "Ruggedized advanced identification mass spectrometer," which disclosure is incorporated herein by this reference in its entirety.

In FIG. 1, the dual ionization micro-mass spectrometer 150 is depicted as including: a vacuum housing 151 (which connects to vacuum system 160); pulsed inlet 130; and dual ionization components 155 (discussed further below). As depicted in FIG. 1, vacuum housing 151 encloses dual ionization components 155 and can be connected to pulsed inlet 130 (which opening can be controlled by valve 161) in order to maintain a vacuum environment around dual ionization components 155. The valve 161 of pulsed inlet 130 can be under control of pulsing control system 175, which can include display/user interface 172/179. For example, pulsing control system 175 can provide visualized information to the user via the display 172. For example, the display 172 can include a computer screen and make available a graphical user interface ("GUI") to the user. The display 172 can also display an abbreviated inspection report, or a simple indicator, to the user indicating certain characteristics of items analyzed in a sample.

In an embodiment, pulsing control system 175 can control aspects of the multiwavelength laser system 180, such as beam on/off functionality and wavelength selection functionality through interface 178. Further still, in an embodiment, pulsing control system 175 can control operation and data acquisition of the dual ionization components 155 through interface 176. Moreover, in an embodiment, pulsing control system 175 can provide valve open/close control to valve 161 through interface 177. The multiwavelength laser 180, pulsing control system 175, pulsed inlet 130, and dual ionization component 155 can work together to provide two-step mass spectrometry that enables the measurement or analysis of refractory organic compounds (for example, sample material 115) adsorbed onto or embedded within geological and/or icy matrices (for example, material 110).

In an embodiment, the analysis provided by mass spectrometer 150 of system 100 can be characterized by a mass range between 28-500 amu, with a limit of detection of 10 ppbw. In an embodiment, mass spectrometer 150 can exhibit detection specificity through the implementation of two distinct but highly complementary ionization sources, specifically a "soft" single photon ionization (SPI) source (for example, $Ar_2$*; 126 nm, 9.8 eV) and a "hard" electron ionization (EI) source (for example, at 70 eV); thereby supporting a "survey mode" measurement followed by electron induced dissociation (EID) tandem mass spectrometry (MS/MS), as needed. In a further embodiment, system 100 can be configured to operate in a range of ambient environmental pressures (for example, 150 kPa to $10^{-3}$ kPa).

Consistent with an embodiment, the dual ionization scheme applied to injected neutral constituents 117 inside the micro-mass spectrometer 150 can offer a flexibility of two complementary ionization methods (electron ionization (EI) and single photon ionization (SPI), as discussed above), which can deliver two distinct "fingerprints" for the identification of sample constituents. The SPI source consistent with this disclosure (discussed further below) can significantly reduce fragmentation of thermally labile and fragile organic compounds compared with other photoionization methods such as: laser desorption-laser ionization mass spectrometry (L2-MS); surface-assisted laser desorption ionization mass spectrometry (SALDI-MS); and resonance-enhanced multiphoton ionization (REMPI). Additionally, the SPI source consistent with this disclosure, when operating in a vacuum, can offer lower variance in ionization cross-section between chemical classes relative to photoionization in ambient conditions, thus can deliver a more quantitative analyses.

Consistent with the disclosure, system 100 of FIG. 1 can provide a contact-free technique to analyze sample composition. Consistent with this disclosure, continuously variable attenuation of the laser energy of multiwavelength laser 180 allows for both low-power "soft" desorption of sample material 115 to ambient neutrals 117 (for the liberation of fragile organics from the sample) and high-power "hard" ablation of the host phase without requiring contact with the sample material 115. Additionally, risks associated with cross-contamination between analyses can be reduced. For example, in an embodiment, reduced interference and enhanced mapping of ion signals can be achieved. Further, interfering ion signals from the matrix material (such as material 110), associated with ionization in ambient conditions, can be minimized. Further still, reduced matrix cross contamination can improve the mapping capability of a heterogeneous distribution of organic molecules across a small sample.

An embodiment consistent with this disclosure can also maximize photon absorption. For example, selectable output wavelengths from multiwavelength laser 180 can allow for enhanced photon substrate coupling during irradiation of different materials 115 and 110 (e.g., ice versus silicate mineral). Consistent with disclosure, pristine samples of material 115 can be generated for input into the mass spectrometer device. For example, the nanosecond pulse widths employed for desorption/ablation can minimize thermal decomposition of the sample 115 (e.g., when contained in an ice matrix) and the degradation of organics in the presence of strong oxidizers (e.g., perchlorates).

Consistent with an embodiment, the orifice of the pulsed inlet 130 adapted for the injection of neutrals can be drastically smaller than that required for ion injection (such as in L2-MS). For example, and without limitation, the diameter of an orifice to inlet 130 consistent with this disclosure can be as small as 5 micrometers in an embodiment. This can minimize the pumping requirement and can enable the use of miniature vacuum pumps for vacuum system 160. The ultra-low RF voltage and power requirement of components of system 100 can reduce the electronics and battery footprint.

Consistent with this disclosure, the transfer of ambient neutrals 117, as opposed to ambient ions, can simplify the design of the inlet system, such as in high-pressure environments where field gradients approach the boundaries of Paschen discharge. Further still, consistent with this disclosure, the absence of complex ion-guide and differential-pressure stages can keep the design of the micro-mass spectrometer relatively simple and cost-effective.

Consistent with this disclosure, dual ionization micro-mass spectrometer 150 can be configured to utilize low-power microelectromechanical systems (MEMS) components integrated in a miniature vacuum cartridge to enable chemical analysis with high sensitivity and specificity.

Figure 2:
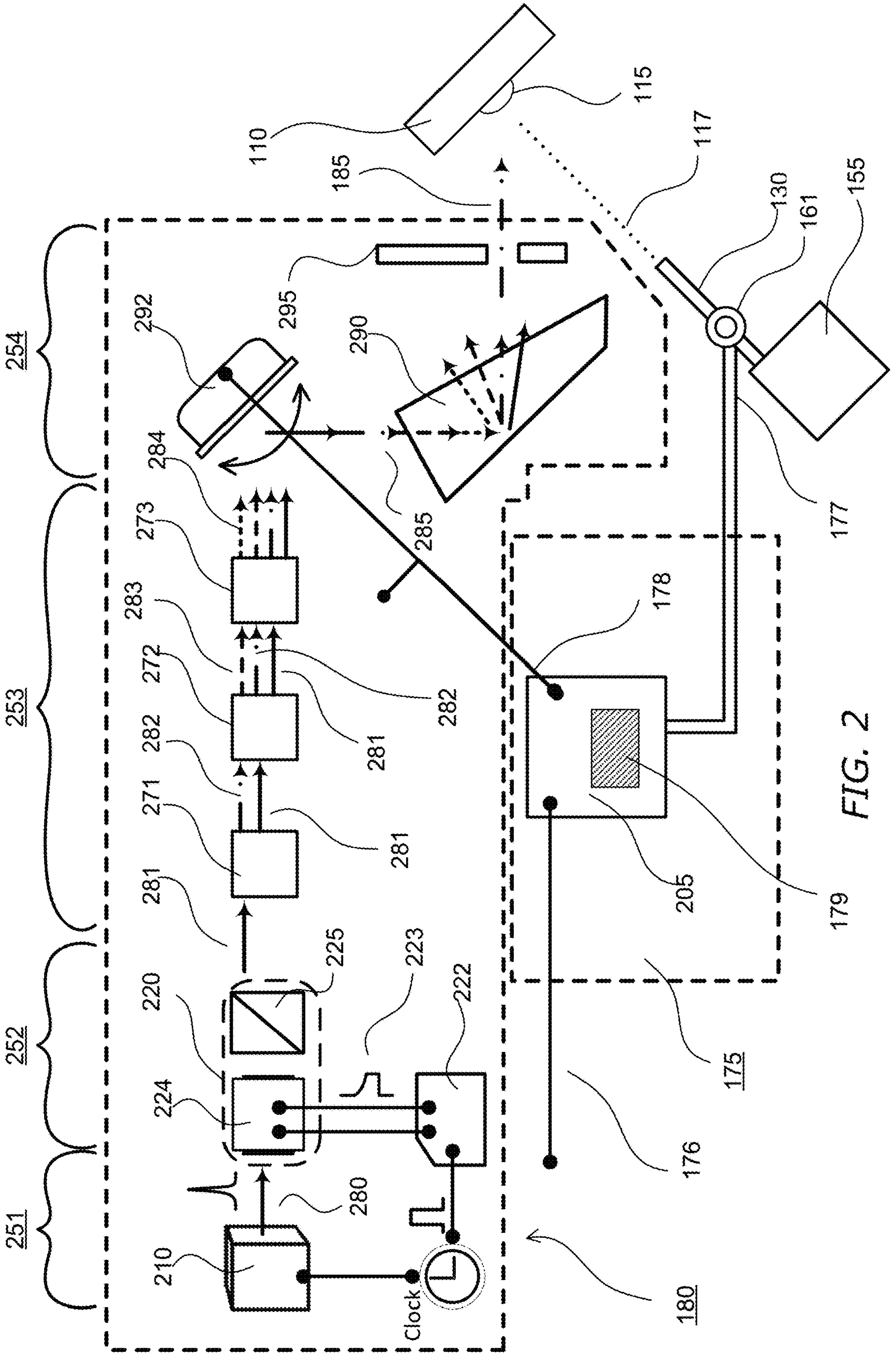
FIG. 2 is a diagram depicting a multi-wavelength laser system consistent with this disclosure coupled to a pulse inlet control consistent with this disclosure.

FIG. 2 depicts aspects of the multiwavelength laser 180. Consistent with this disclosure, multi-wavelength laser 180 can provide selectable output wavelengths on a shot-by-shot basis up to 100 Hz, with fully variable laser energy from 1-100% maximum output without a compromise in beam quality. This design can minimize beam splitting issues at low energies (which is an issue in the "Mars Organic Molecular Analyzer," or "MOMA," flight laser system, for example).

The multiwavelength laser system 180 consistent with this disclosure can be configured to selectively switch between the following wavelengths: 1064 nm (ideal for desorption of icy matrices, and a common LIBS wavelength); 532 nm (a common Raman wavelength); 266 nm (used for laser desorption of organics embedded in geological samples); and 213 nm (optimal for ablation of transparent or translucent minerals or vitreous phases).

To enable tunability and maintain a common focal plane at a surface of sample 115, multiwavelength laser system 180 can be configured to rely on a low-power, lightweight MEMS scanning mirror 292 (or, alternatively, a piezoelectric turning mirror) and a Pellin-Broca prism 290.

As depicted in FIG. 2, the multiwavelength laser 180 can consist of four stages: (1) stage 251, which can include a Q-switched oscillator; (2) stage 252, which can include an electro-optic variable attenuator 220; (3) stage 253, which can include three nonlinear frequency conversion crystals; and (4) stage 254, which can include an active wavelength de-multiplexing system. In an embodiment, the oscillator of multiwavelength laser 180 in stage 251 can use Nd:YAG 210 as the laser gain medium with a $Cr^{4+}$:YAG passive Q-switch to achieve high pulse energy (>1.5 mJ) in a short pulse (2-3 ns), a characteristic desirable for soft ablation of sample 115. Beam 280 at 1064 nm can be produced in stage 251. The multiwavelength laser 180 can be operated in an end-pumped configuration with a fiber coupled laser diode module supplying pump power through a pair of aspheric lenses. This arrangement allows a compact (<10 cm) laser cavity, diode pump, and associated control electronics. To provide precise tuning of the laser output energy without distorting the temporal envelope, an electro-optic attenuator 220 consisting of a rubidium titanyle phosphate (RTP, or RbTiOPO4) Pockels cell 224 (which can be coupled to HV drive 222, which can provide an HV pulse 223 to Pockels cell 224) and polarizing beam splitter cube 225 can actively adjust the transmitted 1064 nm power between 0-100% maximum output. Pockels cell 224 and polarizing beam splitter cube (PBC) 225 can together form electro-optic variable attenuator 220.

The transmitted 1064 nm light 281 can then be converted to a second harmonic beam 282 (i.e., 532 nm), a fourth harmonic beam 283 (i.e., 266 nm), and a fifth harmonic beam 284 (i.e., 213 nm) in stage 253 using a critically phase matched Lithium Triborate (LBO, or LiB3O5) crystal 271 and a pair of Beta Barium Borate (BBO or BaB2O4) nonlinear crystals, (crystals 272 and 273, respectively). LBO crystal 271 and BBO crystals 272 and 273 are suitable materials for multiwavelength laser 180 as these crystals exhibit wide temperature bandwidths (compatible with operations at room temperature), high laser damage thresholds, and good conversion efficiencies. Moreover, BBO crystals 272 and 273 are one of the only crystals offering the necessary transparency and phase-matching capability to function in the deep UV.

The output of the portion of multiwavelength laser 180 that includes the three crystals 271, 272, and 273 (i.e., the output of a nonlinear conversion stage) can contain a mixture of 1064, 532, 266, and 213 nm beams propagating collinearly. The wavelengths may be actively de-multiplexed before illuminating the sample material 115 using a combination of a MEMS mirror scanner 292 and a Pellin-Broca prism 290. Alternatively, a piezoelectric transducer can be substituted for the MEMS mirror 292. The prism 290 can introduce an angular separation between the harmonics via dispersion with low optical loss, and the MEMS scanner 292 can actively change the angle of entry of beam 285 into the prism 290, altering the exit angle for each wavelength, so as to pass through aperture 295. Through this design, each wavelength can be trained on the target surface at the same XY position by simply adjusting the scanning mirror angle. Alternatively, or in addition, prism 290 may be rotated, as is known in the art, to provide a selective wavelength 185 through aperture 295. As shown in FIG. 2, the wavelength selection control may be carried out, in part, by control system 205 (which can also control the angle of prism 290, not shown). Alternatively, or in addition, wavelength selection may be carried by a set of independent controls (not shown).

Components of pulsing control system 175 are also shown in FIG. 2. Controller 205, through interface 178, for example, can be configured to control the on/off functionality of the laser beam 185, and can also be configured to control the selection of wavelength as discussed above. Controller 205, through interface 176 can control aspects of the operation and analysis provided by dual ionization components 155 (not shown in FIG. 2). Further still, controller 205, through interface 177, can be configured to control the open/shut functionality of valve 161.

Figure 10:
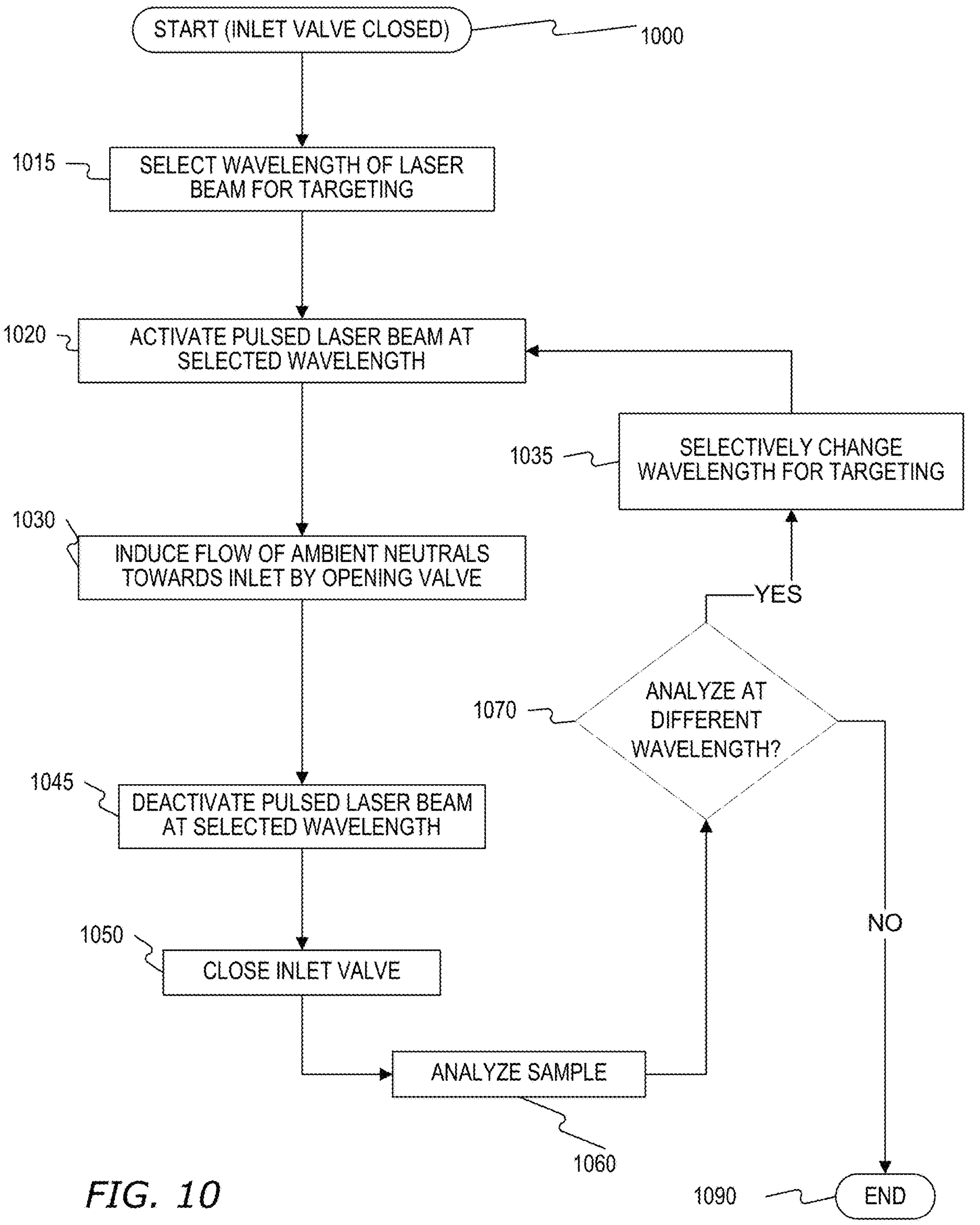
FIG. 10 depicts a method controlling of controlling a pulse inlet consistent with this disclosure.

Consistent with this disclosure, the effect of pulse control system 175 is to coordinate the targeting of sample 115 with laser beam 185 (which will result in the production of ambient neutrals 117) with the opening of inlet 130, so as to result in the movement of the ambient neutrals (following their formation) into the inlet 130. After the multiwavelength laser 180 has ablated a sufficient amount of sample material 115 (which can involve multiple pulses), and after a sufficient amount of ambient neutral material 117 has migrated through inlet 130 (as a result, at least partly, of the vacuum environment in the dual ionization micro-mass spectrometer 155) for analysis by the micro-mass spectrometer, then pulsing control system 175 controls the closing of valve 161. FIG. 10 is a flowchart of a method consistent with this disclosure. Step 1000 indicates that the inlet valve 161 is in a closed position. Accordingly, there is no fluid communication between the vacuum environment enclosing dual ionization components 155 and the ambient environment just outside of inlet 130. Step 1015 can involve the wavelength selection system of multiwavelength laser 180, and can therefore relate to the selection of a wavelength for targeting sample 115. Step 1020 can involve controller 205 and interface 178, and relates to the on/off functionality of the laser beam of multiwavelength laser system 180, thereby producing a targeted beam 185 at sample 115 at a selected wavelength. Step 1030 relates to the creation of a flow of ambient neutrals into inlet 130 by opening valve 161, thereby creating fluid communication between the vacuum environment surrounding dual ionization components 155 and the ambient environment, which now contains the ambient neutrals 117. When a sufficient amount of ambient neutrals have entered into the environment surround the dual ionization components 155, then the pulsed laser beam for targeting may be switched off (step 1045) and the inlet value 161 can be closed (step 1050). At this point controller 205 can operate the dual ionization components 155 in order to acquire data associated with the ambient neutrals 117. Optionally, following data acquisition, the controller 205 may selectively change the wavelength being directed at sample 115 as described above in connection with multi-wavelength laser system 180. If changed, then the steps proceed as described above starting with step 1020.

Alternatively, after acquiring data associated with the ambient neutrals 117, if analysis is considered complete, then the end (step 1090) can be reached.

One of ordinary skill in the art would appreciate that one of the effects of controller 205 is to coordinate the operation of multiwavelength laser 180 with the opening of a channel (through inlet 130) to the dual ionization-mass spectrometer. This coordination can be accomplished through any combination of timing circuits, hardware, and software, consistent with this disclosure.

Figure 11:
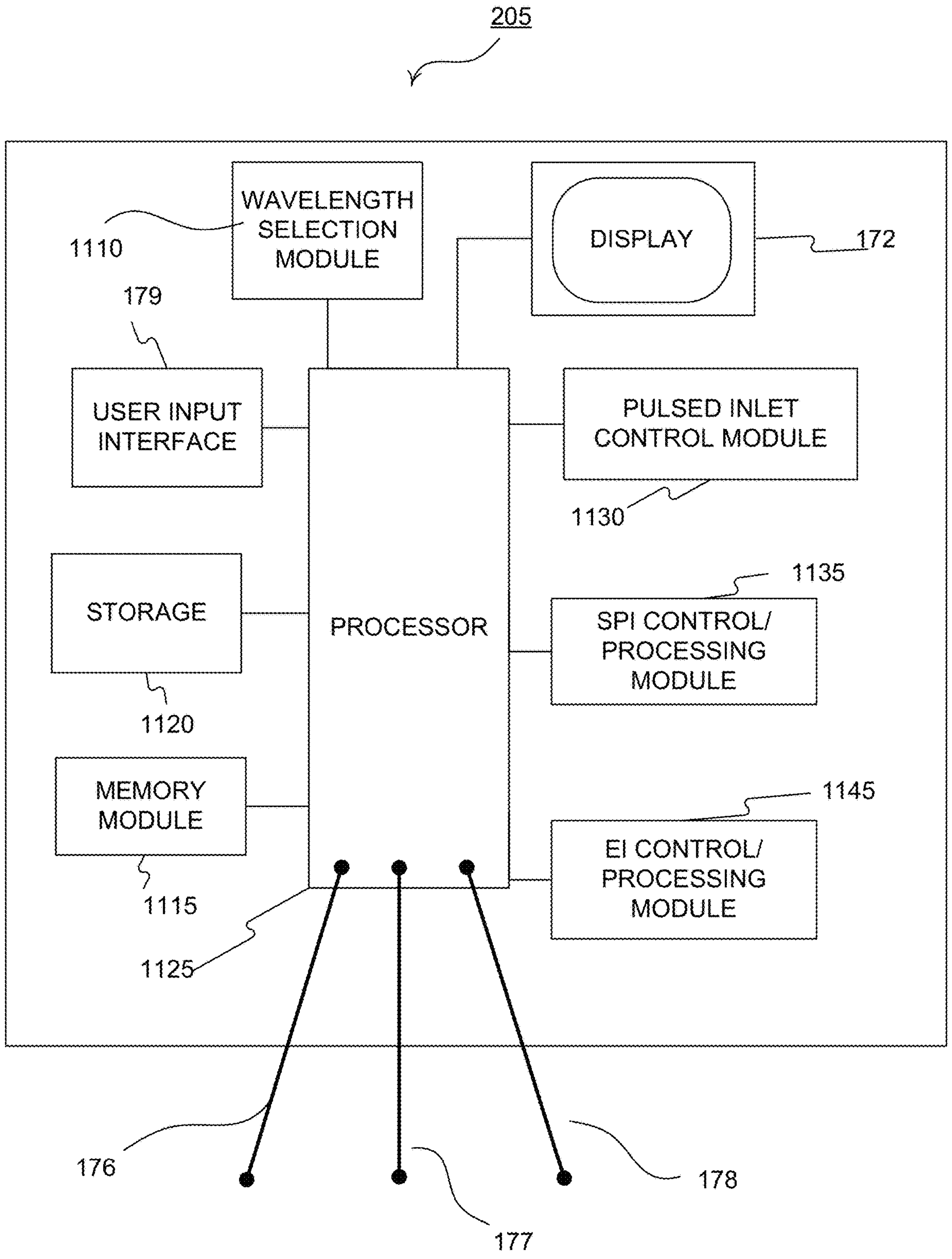
FIG. 11 is a schematic of an exemplary control system for controlling the laser beam, the dual-ionization micro-mass spectrometer, and the pulsed inlet consistent with the present disclosure.

FIG. 11 is a schematic diagram of controller 205, which can manage the opening and closing of valve 161 at pulsed inlet 130, the on/off functionality and wavelength selection of multiwavelength laser system 180, and the operation and analysis of dual ionization micro-mass spectrometer 150. Controller 205 can include a processor 1125, a memory module 1115, a storage device 1120, an input interface 179, a display device 172, a wavelength selection module 1110, a pulsed inlet control module 1130, an SPI control/processing module 1135, and an EI control/processing module 1145. Processer 1125 can also be coupled to interface 176 (which provides control of dual ionization micro mass spectrometer 150), coupled to interface 177 (which provides control of valve 161), and coupled to interface 178 (which provides control of multiwavelength laser system 180).

In an embodiment, the controller 205 can be accessed and controlled by a user using the input interface 179. The input interface 179 can be available for the user to input information into controller 205, and can include, for example, an interface for a keyboard, a mouse, a touch screen and/or optical or wireless computer input devices. The user can input control instructions via the input interface 179 to control the operation of the controller 205.

The controller 205 can also provide visualized information to the user via the display 172. For example, the display 172 can include a computer screen and make available a graphical user interface ("GUI") to the user. For example, the display 172 can display an abbreviated inspection report, or a simple indicator, to the user indicating certain characteristics of items identified in an acquired sample.

The controller 205 can include additional, fewer, and/or different components than those listed above. The type and number of listed devices are exemplary only and not intended to be limiting.

The processor 1125 can be a central processing unit ("CPU") or a graphic processing unit ("GPU"). The processor 1125 can execute sequences of computer program instructions to perform various processes that will be explained in greater detail below. The memory module 1115 can include, among other things, a random access memory ("RAM") and a read-only memory ("ROM"). Generally, memory module 1115 can be a non-transitory computer readable medium. The computer program instructions can be accessed and read from the ROM, or any other suitable memory location, and loaded into the RAM for execution by the processor 1125. The processor 1125 can include one or more printed circuit boards, and/or a microprocessor chip.

The storage device 1120 can include any type of mass storage suitable for storing information. For example, the storage device 1120 can include one or more hard disk devices, optical disk devices, or any other storage devices that provide data storage space. The storage 1120 can also include analysis and organization tools for analyzing and organizing data and/or information contained therein.

In an embodiment, the wavelength selection module 1110 can be configured to control the selection of wavelength of the laser beam provided by the multiwavelength laser system to the sample 115. The pulsed inlet control module 1130 can be configured to control the laser beam on/off functionality, as well as the opening and closing of valve 161. Further still, the SPI control/processing module can control the operation and data acquisition of the SPI functionality of the dual ionization micro-mass spectrometer 155. Moreover, the EI control/processing module can control the operation and data acquisition of the EI functionality of the dual ionization micro-mass spectrometer 155.

Figure 3:
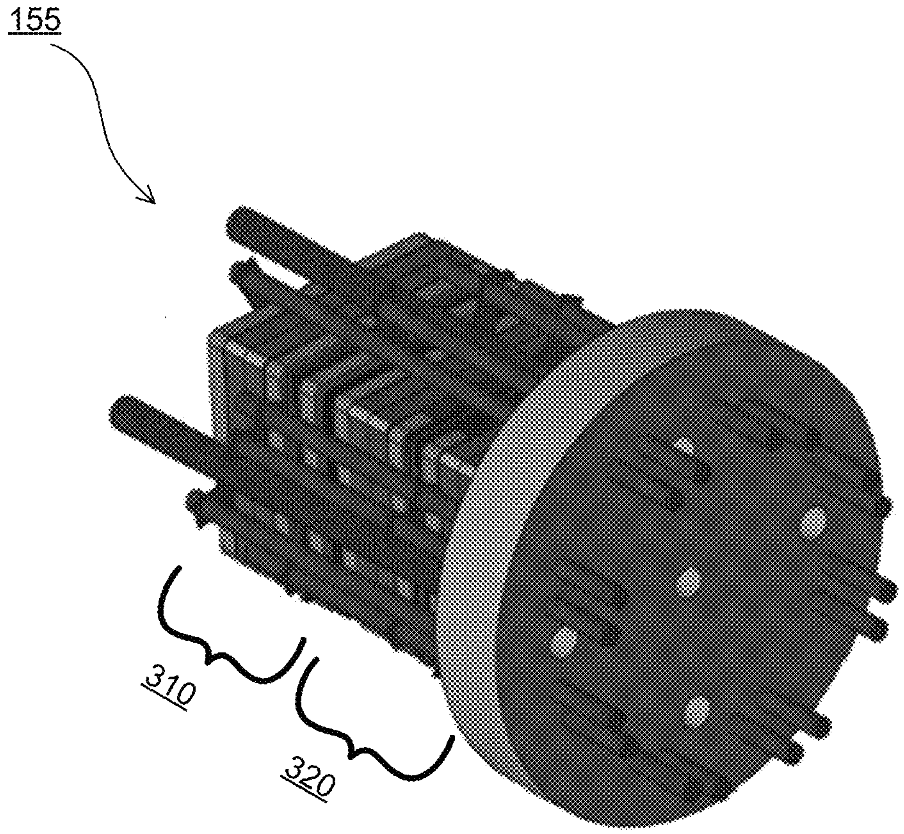
FIG. 3 is a view of a component of micro-mass spectrometer consistent with this disclosure.

FIG. 3 depicts a perspective of dual ionization component 155 without vacuum housing 151. Also depicted in FIG. 3 are the SPI region 310, associated with single photon ionization, and region 320, associated with electron ionization.

Figure 4:
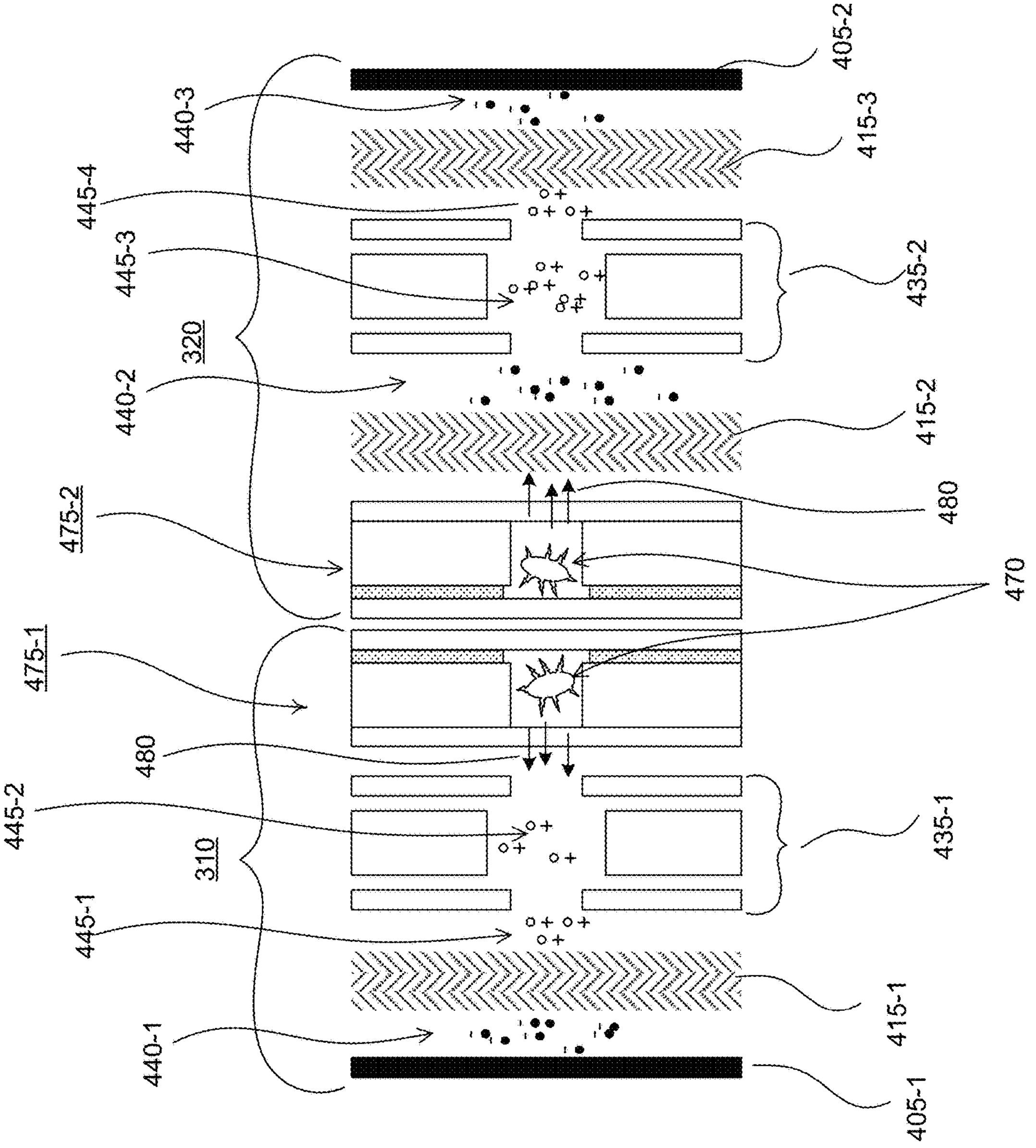
FIG. 4 is an exploded view of the components of the micro-mass spectrometer of FIG. 3.

FIG. 4 provides an exploded view of a cross section of a portion of dual ionization component 155. To the left of FIG. 4 is region 310, associated with single photon ionization, and to the right of FIG. 4 is region 320 associated with electron ionization. Consistent with an embodiment, each of region 310 and region 320 includes its own ionization source. In region 310 the ionization source is plasma cell 475-1, which will be discussed further below. In region 320, the ionization source is a combination of plasma cell 475-2 (similar to plasma cell 475-1, and discussed below) and microchannel plates 415-2—where microchannel plates 415-2 acts as an electron multiplier. More specifically, ambient neutrals 117 that enter dual ionization micro-mass spectrometer 150 can be ionized by radiation 480 emitted by plasma cell 475-1, producing target ions 445-2, which can then be trapped in the ion trap array 435-1. Similarly, ambient neutrals that enter dual ionization micro-mass spectrometer 150 can be ionized by electrons, produced by the combination of plasma cell 475-2 and microchannel plates 415-2, producing target ions 445-3, trapped in ion trap array 435-2. Anode 405-1 is depicted at the left of region 310, associated with the signal from the SPI module of the dual ionization micro-mass spectrometer 150, and anode 405-2 is depicted to the right of region 320, associated with the signal from the EI module of the dual ionization micro-mass spectrometer 150. Ejected ions 445-1 and ejected ions 445-4 are also shown, as are electrons 440-1 and electrons 440-3. Microchannel plates 415-1, again, act as electron multipliers for the signal from the SPI module, and microchannel plates 415-3 act as electron multipliers for the signal from the EI module.

Figure 5:
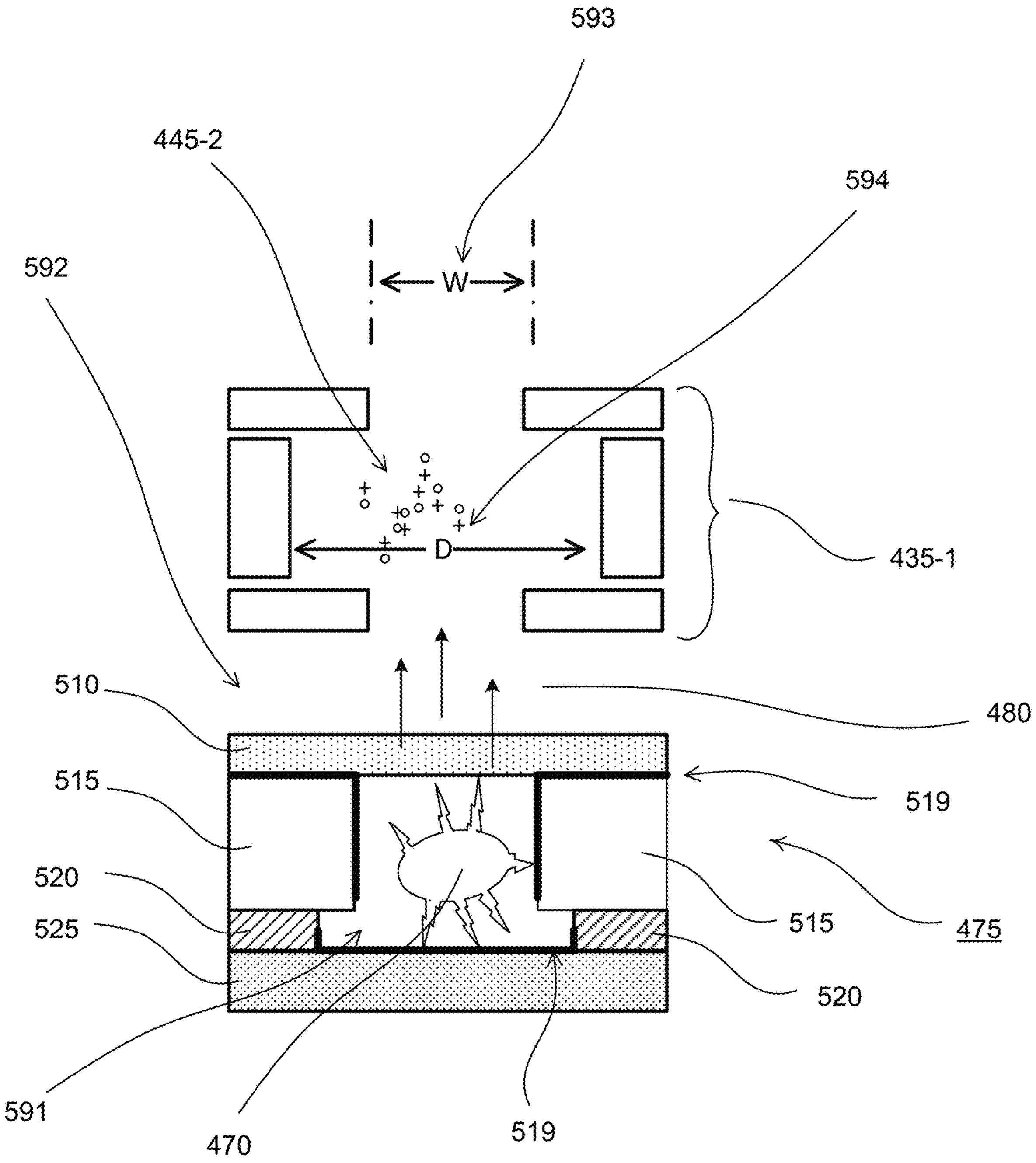
FIG. 5 is a cross sectional view of a plasma cell component of the micro-mass spectrometer of FIGS. 3 and 4.

FIG. 5 depicts plasma cell 475 in further detail. Consistent with the disclosure, plasma cell 475 is configured as a micro-scale vacuum ultraviolet emitter, designed to generate high energy photons (~10 eV; 123 nm). In an embodiment, a plurality of plasma cells 475 can be configured as an encapsulated micro-scale vacuum ultraviolet array chip built into a silicon-on-insulator wafer using MEMS technology. The VUV emitting area can be matched to and integrated with micro-scale ion trap array to perform SPI-mass spectrometry. Consistent with this disclosure, this approach can deliver localized high-energy photons inside each micro-scale ion trap array 435 to generate efficient photoionization.

Plasma cell 475 is a micro-scale cell that can exploit the electrical breakdown between two electrodes positioned at submm gaps. This breakdown can occur at low voltages if the pressure-times-distance (pd) value is the minimum in the Paschen curve. Electrons generated during the breakdown gain energy as they accelerate to the other electrode and initiate the excimer reactions. The excimers typically disintegrate in several nanoseconds producing VUV light, which is characteristic of the gas medium. Consequentially, a micro-scale vacuum ultraviolet consistent with this disclosure can be ignited rapidly and operated in a pulsed mode to maintain low-power requirements, extend longevity, and offer 1000× SWaP savings (all factors multiplied) over commercially available VUV excimer lamps. Additionally, plasma discharges for micrometer-scale gaps in one atmosphere can be initiated at extremely low breakdown voltages, which 1) reduce the need for high voltage supplies and 2) offer a higher VUV output/power due to increased activities at elevated pressure.

As shown in FIG. 5, plasma cell 475 can be a MEMS-fabricated, fully encapsulated chip in a silicon on insulator ("SOI") wafer. A SOI substrate offers a straightforward design to fabricate encapsulated cavities. Anode 525 (which can be silicon) can be separated from cathode 515 using a dielectric gap (such as silicon dioxide 520), where a cavity 591 can be formed. Bonding material 519 is shown using a thickened line. Window 510 can comprise $MgF_2$. Consistent with this disclosure, an array of 200-cylindrical cavities (such as a plurality of cavities 591) can be fabricated in a substrate using DRIE. The dielectric gap (i.e., the thickness of silicon dioxide layer 520) can be adjusted, and the pressure associated with the filler gas in the cavity 591 can be adjusted to optimize the parallel operation of all the plasma cells 475. In an embodiment, the pressure in cavity 591 can be greater than 300 torr. Furthermore, in this case, the semiconducting anode 525 (silicon) can also act as ballast, obviating the need for individual resistors.

Consistent with an embodiment, the dielectric gap 520 between anode 525 and cathode 515 can be approximately 250 micrometers, and an ignition voltages of 350 VDC can be applied. Furthermore, as shown in FIG. 5, a diameter W 593 associated with an entrance to ion trap array 435-1 can be approximately 200 micrometers, and the diameter D 594 inside ion trap array 435-1 can be approximately 700 micrometers. With these parameters, plasma power dissipation of 5 mW per cell has been observed. In Ar, radiant powers of up to 6% of the input DC power have been observed for static conditions (El-Habachi et al., 1998). Consistent with the disclosure, for a plasma cell 475, assuming a conservative radiant power of 3% and VUV transparency of ~50% (at 126 nm) for the $MgF_2$ window 510, and assuming a solid angle of 1 steradian for photon exit towards the ion trap array 435-1, 200 plasma cells 475 can transmit VUV power in the range of 0.79 mW for ionization in a total emittance area of 6.25 $mm^2$. Consistent with this disclosure, an array of plasma cells 475 and can provide a higher PI efficiency inside each ion trap array 435-1, as the array of micro-scale vacuum ultraviolet emitters consists of localized VUV cells that can be placed close (1-2 mm) to the ion trap arrays 435-1, unlike conventional test setups consisting of long path lengths, where PI efficiency is low due to divergence.

Consistent with a further embodiment, dielectric gap 520 can be approximately 100 micrometers.

Because all the ion-optic components, including the ionization sources 475, ion trap arrays 435, and ion detection components, are flat planar components, a stacking approach (as shown, for example, in FIG. 3) facilitates assembly and iterative optimization. C-shaped ceramic spacers allow the necessary vacuum gaps between components to prevent electrical breakdown and provide clearances for gas conductance.

When fully populated with components, the effective vacuum cell volume of the dual ionization micro-mass spectrometer can be approximately 50 mL.

Critical high-precision alignment of individual components and subcomponents can be incorporated via MEMS design. Matched holes and pin inserts can allow the alignment between the components (such as the ion trap array chip and the micro-scale VUV emitter). The optimized spacing between the micro-scale VUV emitter and the ion trap array can enable the highest photoionization inside each trap while minimizing stray photons.

Figure 6:
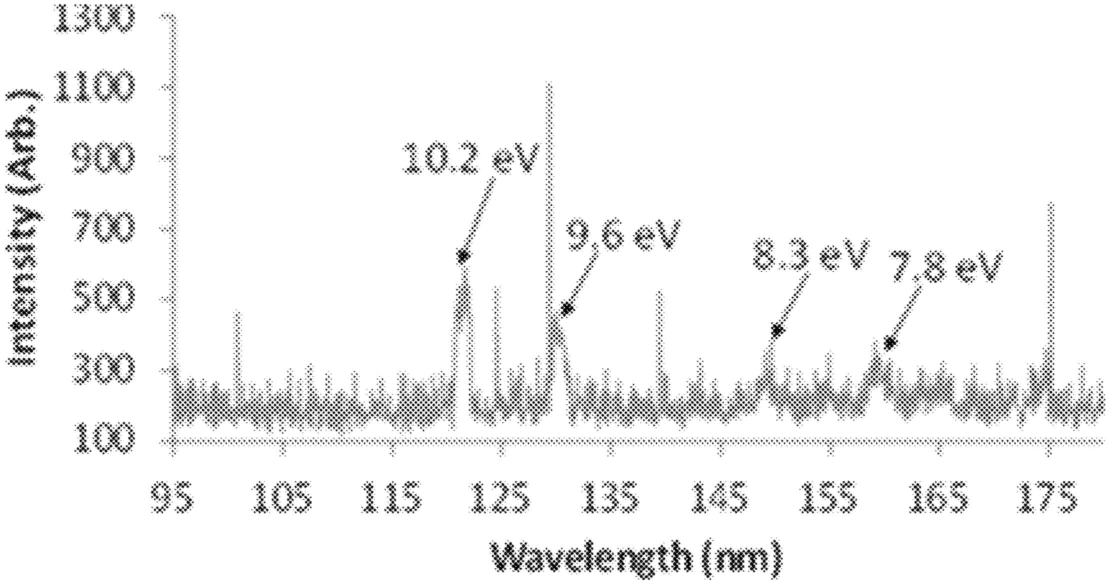
FIG. 6 shows the VUV wavelengths available from a plasma cell consistent with of this disclosure, where the plasma is formed from $Ar_2$.

FIG. 6 depicts a partial emission spectrum of a plasma cell 475 consistent with this disclosure, and which is characterized by high-energy photons.

Figure 7:
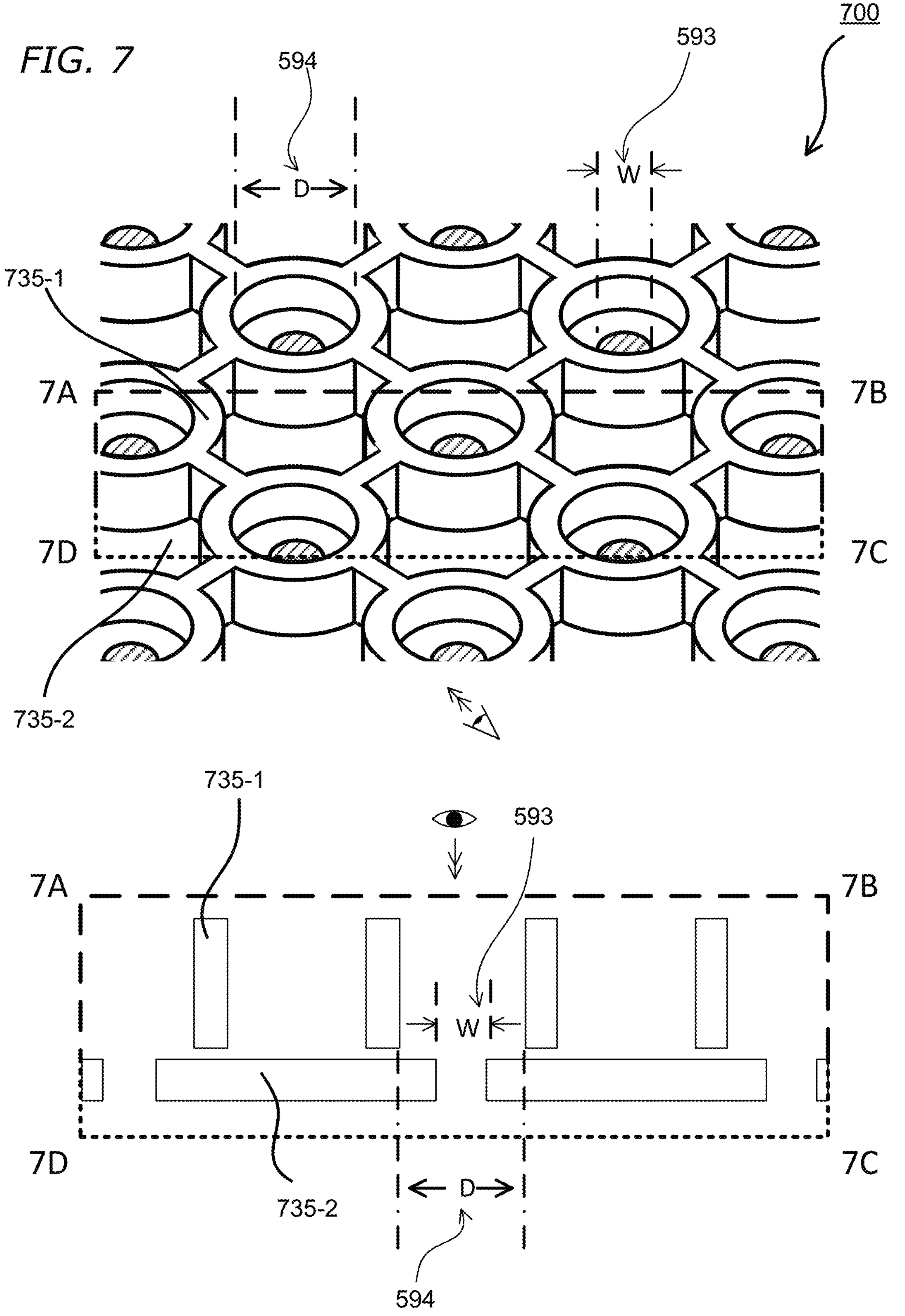
FIG. 7 depicts two views of a portion ion trap of the micro-mass spectrometer of FIGS. 3 and 4 consistent with the present disclosure.

FIG. 7 depicts two perspectives of a portion of an ion trap array 435 consistent with this disclosure. The top portion of FIG. 7 provides an angled perspective of two components 700 of ion trap array 435. The box 7A-7B-7C-7D provides a cross section slice of the two components 700, which is shown in cross-section view in the lower portion of FIG. 7. Array 735-1 is an array of micro-cylindrical chambers, each cylindrical chamber forming the relatively large central chamber of diameter D 495 in ion trap array 435. Plate 735-2 is a plate with a series of smaller entrance/exit holes of diameter W 593. When constructed consistent with this disclosure, a complete ion trap array 435 would include an additional plate similar to 735-2, placed on the "top" (from the perspective of FIG. 7) of array 735-1, with the smaller entrance/exit holes of diameter W 593 lined up with the corresponding holes of diameter W 593 in plate 735-2.

As shown in FIG. 7, the ion trap arrays 435, where the chamber trapping the ions can have a diameter of approximately 700 micrometers, can be in a micro-cylinder geometry, and configured to be aligned with the array of plasma cells 475. The ion trap arrays 435 can offer low-voltage, low-power mass analysis. For example, the equation $V_{rf}=(m\ q\ r_0^2\Omega^2)\div(4\ A_2\ e)$, governs the voltage $V_{rf}$ required to selectively eject a certain mass m ion, and shows that $V_{rf}$ is proportional to the radius $r_0^2$ of the trap and the frequency $\Omega^2$ of RF voltage, where $A_2$ is the quadrupolar coefficient of the trapping potential, q is the operating parameter, and e is the charge of an electron.

Figure 8:
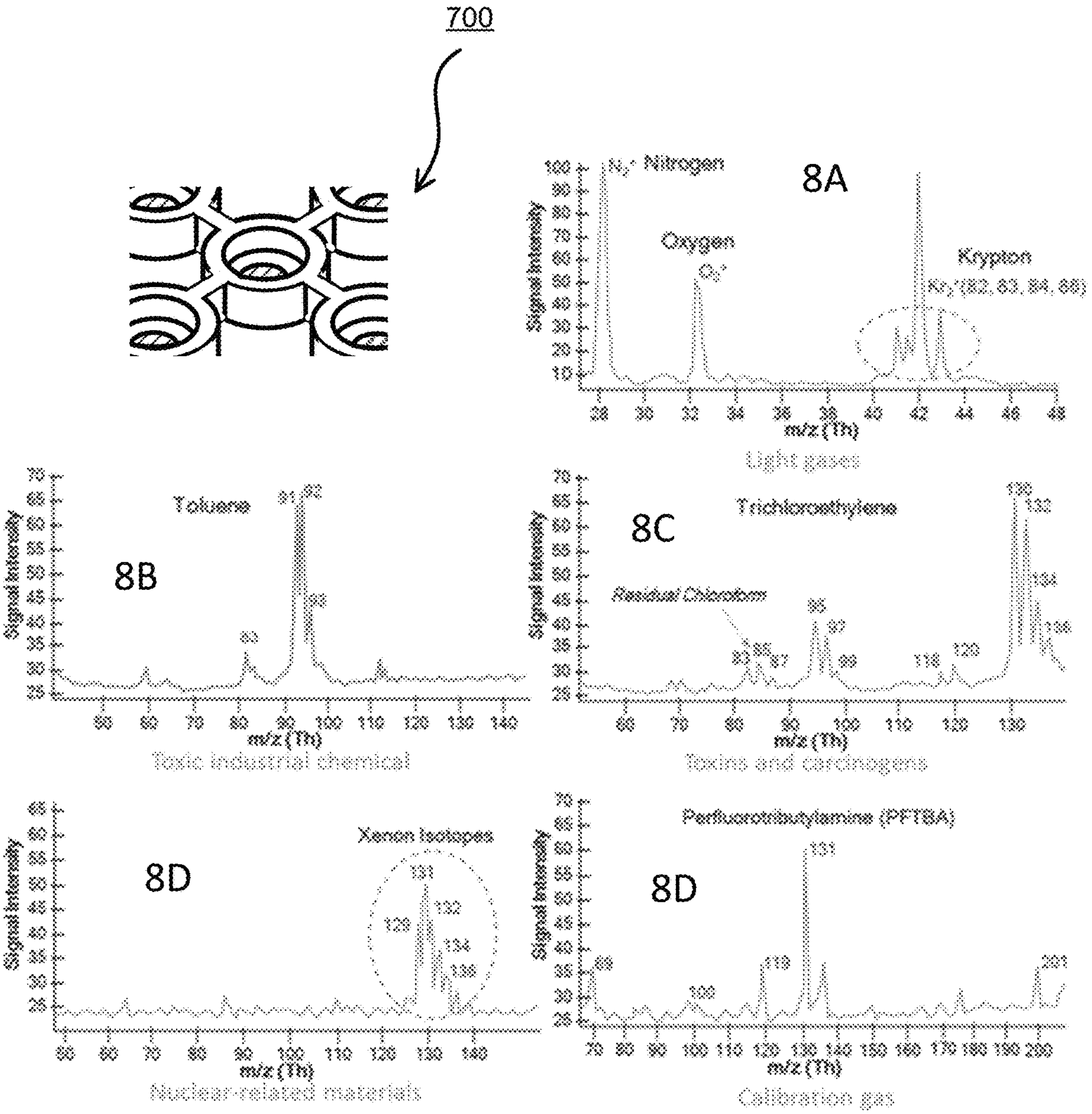
FIG. 8 depicts the sensitivity of the micro-mass spectrometer using the ion trap components of FIG. 7.

Ion trap arrays 435 consistent with this disclosure can be fabricated using nonconductive substrates and selective metallization to generate an electric potential that mimics that of solid metal geometry. Further, ion trap arrays 435 can be fabricated to micrometer-scale (with diameter D 594 being approximately 700 micrometers) with micro-scale ion traps and ion trap arrays stainless steel (SS), silicon (Si), and silicon on insulator (SOI). Consistent with this disclosure, ion trap arrays 435 can exhibit unit-amu mass resolution using SOI and Si material a narrow mass range (28-200 amu) and a broader mass range (up to 500 amu) using SS ion trap arrays with RF voltages requirements below 250 $V_{0\text{-}p}$ and average RF power as low as 250 mW to cover the broad mass range. FIG. 8 depicts exemplary mass spectra for different chemical classes obtained with ion trap arrays consistent with this disclosure using EI. FIG. 8A depicts results for certain light gases, FIG. 8B depicts results for certain toxic industrial chemicals, FIG. 8C depicts results for certain toxins and carcinogens, FIG. 8D depicts results for certain nuclear-related materials, and FIG. 8E depicts results for a calibration gas.

The reduced voltage requirement of ion trap arrays consistent with this disclosure can enable multifaceted simplicity and miniaturization. Low RF voltages required to operate the ion trap arrays can be generated by a very low-power, high-Q, LC circuit, where the inductor coil can be as small as a US quarter coin. Low voltage levels also reduce the need for intermediate RF amplifiers, required for larger traps (i.e. MOMA), which have intrinsic power consumption of 6 W. Consequently, ion optical components can be integrated in a tighter configuration, enabling smaller instrument packages and vacuum cells (thereby reducing pumping requirements). Embodiments consistent with this disclosure can exhibit ultra-low power (5 J/analysis) and RF voltage requirements (<250 $V_{0\text{-}p}$ to cover 500 amu) of the ion trap arrays and other low-power ion-optics components.

Embodiments consistent with this disclosure can exhibit a higher sensitivity (10-ppbw), broader mass range (28-500 amu), and a single-amu mass discriminator. Consistent with this disclosure, a diameter D 594 being approximately 700 micrometers can provide a significant power savings from the miniaturization disclosed herein. For an array of ion trap arrays consistent with this disclosure, the single-element performance (i.e., single trap peak) can dominate the collective resolution of an array. The number of trapped, analyzable ions in each trap can scale as $1.55\text{-}1.7^{th}$ order of the radius. Therefore, scaling to an array of 200 ion trap arrays can match the sensitivity range (typically 1-10 ppbw) of a commercial larger trap ($r_0$ being approximately 1 cm). The embodiment disclosed herein can be implemented with a 200-element array in a high-tolerance MEMS fabrication and packaging scheme to maintain a collective 1-amu mass resolution across the array. The ion optics software, SIMION 8.1, can be used, consistent with this disclosure, to optimize the $z_0/r_0$ ratio for a 350-micrometer trap radius with a 100-micrometer dielectric gap 520, and an embodiment can be fabricated by building the ion trap array chip by aligning and bonding 3 Si-electrodes. To produce highly uniformed and compliant ion trap array electrodes, one can use Norcada (a MEMS fabrication facility) to fabricate the electrodes with state-of-the-art photolithography, deep reactive ion etching (DRIE), and metal sputtering. The ion trap electrodes can then be bonded and integrated into a fully functional ion trap array 435.

Figure 9:
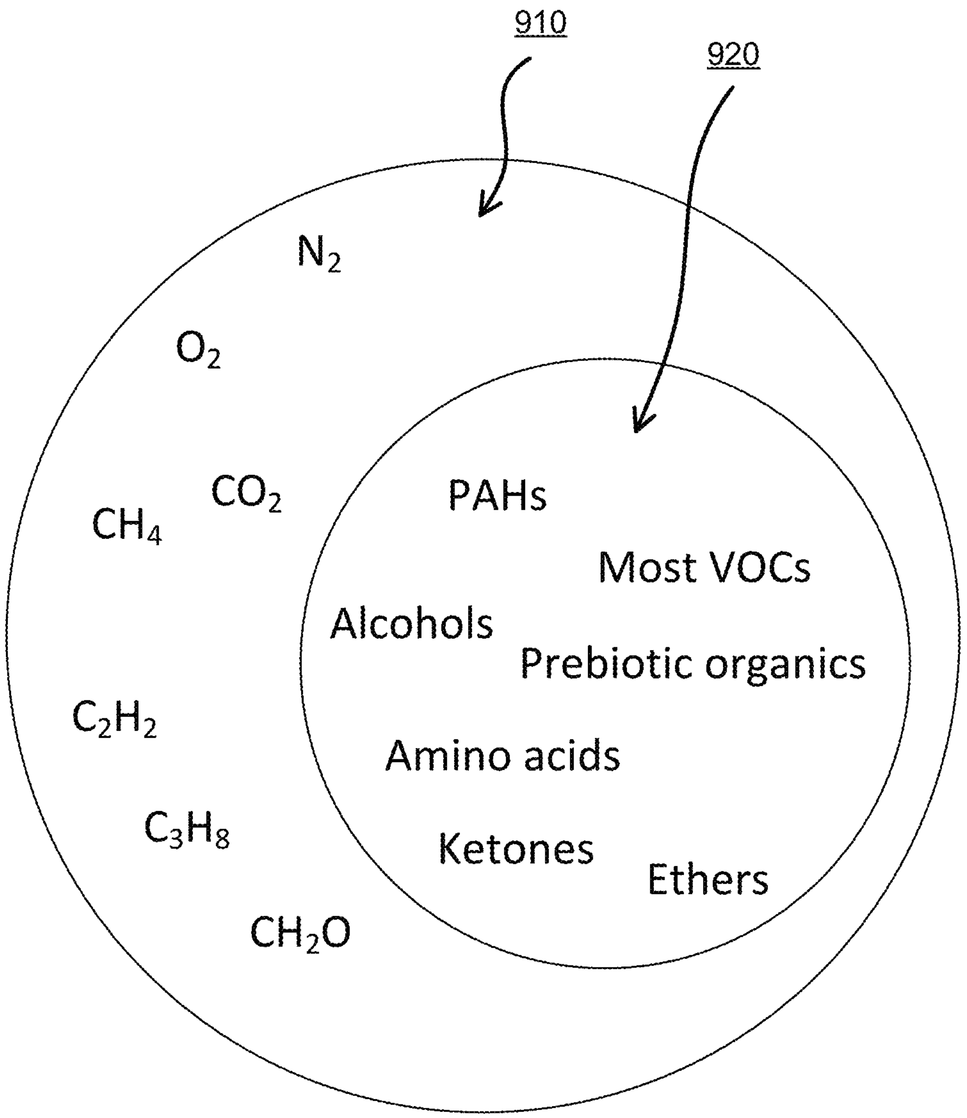
FIG. 9 is a Venn diagram depicting the sensitivity of the single photon ionization mode and the electron ionization, consistent with this disclosure.

Incorporation of EI and SPI-mass spectrometry within a single instrument can offer unprecedented performance characteristics by delivering the ability to 1) de-convolute busy mass spectral data and 2) derive a more detailed and accurate structural information via EID tandem mass spectrometry. Consistent with this disclosure, EI and SPI sources compatible with the ion trap arrays can be fabricated to implement two ion-optics modules that independently perform EI-mass spectroscopy and SPI-mass spectroscopy. Availability of such dual ionization sources can make the system 100 ideal for analyzing a broad range of chemical classes including light gases, VOCs, alkanes, alkenes, alkynes, alcohols, ethers, aldehydes and ketones, and progressively more complex organics. This is depicted in FIG. 9. Region 910 is associated with EI methods of analysis (for example, at 70 eV) and can involve fragmented peaks, while region 920 is associated with SPI method of analysis (for example, at 9.8 eV) and can involve molecular peaks.

In particular, a combination of EI and SPI mass spectroscopy consistent with this disclosure can enable a broader and unambiguous chemical identification scheme. Among other things, the presence of fragmented peaks and molecular peaks of the same compound can relieve de-convolution efforts.

SPI-mass spectroscopy, by virtue of VUV photons, can ionize chemicals with an ionization potential lower than the photon energy of the VUV radiation and offers a selective ionization method, which results in cleaner spectra centered around prominent molecular ion peaks. This approach can cover a broad range of prebiotic biomarkers without interfering signal from light gases (as depicted in FIG. 9).

In a further embodiment, consistent with this disclosure, an EI source (rather than the plasma cell 475 coupled with microchannel plates 415-2) can be a COTS UV LED (255 nm) (Sensor Technology Inc.) coupled with microchannel plates 415-2. This embodiment can provide a pulsed cold-cathode EI source to generate electron current fluxes upwards of 100 microamperes/$cm^2$ using a 3-plate microchannel plate stack.

Embodiments of system 100 consistent with this disclosure can operate in environment pressures from above atmospheric pressure down to $10^{-3}$ kPa. Consistent with this disclosure, the pulsed inlet system and the multiwavelength laser 180 can exhibit sufficient physical flexibility to perform in a variety of configurations.

Other embodiments of the invention will be apparent to those skilled in the art from consideration of the specification and practice of the embodiment disclosed herein. It is intended that the specification and examples be considered as exemplary only, with a true scope and spirit of the invention being indicated by the following claims.

What is claimed is:

1. A laser-assisted micro-mass spectrometer, comprising:
- a pulsed inlet;
- a multi-wavelength laser system;
- a first mass spectrometer module comprising a plurality of first ionization sources; and
- a second mass spectrometer module comprising a plurality of second ionization sources;
- wherein said pulsed inlet is configured to receive a neutral sample of analyte material and provide it to said first mass spectrometer module; and
- wherein said pulsed inlet is further configured to receive said neutral sample of analyte material and provide it to said second mass spectrometer module.

2. A laser-assisted micro-mass spectrometer, comprising:
- a pulsed inlet;
- a multi-wavelength laser system; and
- a first mass spectrometer module comprising a plurality of first ionization sources;
- wherein said pulsed inlet is configured to receive a neutral sample of analyte material and provide it to said first mass spectrometer module;
- wherein said multi-wavelength laser system is configured to generate at least two laser beams, each laser beam being characterized by a respective wavelength; and
- wherein said at least two laser beams, when directed to a target of analyte material, are configured to generate said neutral sample of analyte material.

3. The laser-assisted micro-mass spectrometer of claim 2,
- wherein said pulsed inlet comprises a valve; and
- wherein said system further comprises: a pulse control, wherein said pulse control comprises non-transitory computer readable medium storing instructions that when executed by a control processor cause the control processor to perform a method of acquiring said neutral sample, the method comprising:

opening said valve on said inlet;

closing said valve on said inlet after at least one of said two laser beams has generated said neutral sample, and at least a portion of said neutral sample has passed through said inlet.

4. A laser-assisted micro-mass spectrometer, comprising:

a pulsed inlet;

a multi-wavelength laser system; and a first mass spectrometer module comprising a plurality of first ionization sources;

wherein said pulsed inlet is configured to receive a neutral sample of analyte material and provide it to said first mass spectrometer module;

wherein said plurality of first ionization sources is a plurality of vacuum ultraviolet light sources; and wherein each of said plurality of vacuum ultraviolet light sources comprise:

a plasma cell for generating a plasma, the plasma cell comprising an anode, a cathode, a dielectric gap, and a window layer substantially transparent to at least a portion of vacuum ultraviolet light emitted by the plasma, the plasma cell being configured to contain a gas suitable for generating the plasma.

5. The laser-assisted micro-mass spectrometer of claim 4, wherein said plurality of first ionization sources further comprise at least one micro channel plate.

6. The laser-assisted micro-mass spectrometer of claim 5, further comprising a first array of ion traps, each ion trap in said first array including an ion trap chamber in fluid communication with a first ion trap aperture and a second ion trap aperture;

wherein said plurality of vacuum ultraviolet light sources are arranged in a second array; and wherein said first array of ion traps and said second array of vacuum ultraviolet light sources are arranged such that each ion trap in said first array is disposed across from a corresponding vacuum ultraviolet light source in said second array.

7. A laser-assisted micro-mass spectrometer, comprising:

a valve associated with a pulsed inlet;

a multi-wavelength laser system;

a pulse control;

wherein said multi-wavelength laser system is configured to generate at least two laser beams, each laser beam being characterized by a respective wavelength; and wherein said at least two laser beams, when directed to a target of analyte material, are configured to generate a neutral sample of analyte material;

wherein said pulse control comprises non-transitory computer readable medium storing instructions that when executed by a control processor cause the control processor to perform a method of acquiring said neutral sample, the method comprising:

opening said valve;

closing said valve after at least one of said two laser beams has generated said neutral sample, and at least a portion of said neutral sample has passed through said pulsed inlet.

8. The laser-assisted micro-mass spectrometer of claim 7, further comprising:

a first mass spectrometer module comprising a plurality of first ionization sources;

wherein said pulsed inlet is configured to receive said neutral sample and provide it to said first mass spectrometer module.

9. The laser-assisted micro-mass spectrometer of claim 8, wherein said plurality of first ionization sources is a plurality of vacuum ultraviolet light sources; and wherein each of said plurality of vacuum ultraviolet light sources comprise:

a plasma cell for generating a plasma, the plasma cell comprising an anode, a cathode, a dielectric gap, and a window layer substantially transparent to at least a portion of vacuum ultraviolet light emitted by the plasma, the plasma cell being configured to contain a gas suitable for generating the plasma.

10. The laser-assisted micro-mass spectrometer of claim 9, wherein said plurality of first ionization sources further comprise at least one micro channel plate.

11. The laser-assisted micro-mass spectrometer of claim 9, further comprising a first array of ion traps, each ion trap in said first array including an ion trap chamber in fluid communication with a first ion trap aperture and a second ion trap aperture;

wherein said plurality of vacuum ultraviolet light sources are arranged in a second array; and wherein said first array of ion traps and said second array of vacuum ultraviolet light sources are arranged such that each ion trap in said first array is disposed across from a corresponding vacuum ultraviolet light source in said second array.

12. A method of acquiring a neutral sample for mass spectroscopy, the method comprising:

selecting a first laser wavelength for generating said neutral sample of analyte from a target;

generating said neutral sample of analyte from said target using pulses of said first laser wavelength;

opening a valve on an inlet to a first mass spectroscopy module, permitting fluid communication between said generated neutral sample and a region adjacent said first mass spectroscopy module;

acquiring at least a portion of said neutral sample in said region adjacent said first mass spectroscopy module through said inlet for analysis by said first mass spectroscopy module; and closing said valve on said inlet.

13. The method of claim 12:

wherein said opening said valve on said inlet to said first mass spectroscopy module further permits fluid communication between said generated neutral sample and a region adjacent a second mass spectroscopy module;

said method further comprising:

acquiring at least a second portion of said neutral sample in said region adjacent said second mass spectroscopy module through said inlet for analysis by said second mass spectroscopy module.

14. The method claim 12, wherein said acquiring at least a portion of said neutral sample in said region adjacent said first mass spectroscopy module through said inlet is accomplished through the use of a pressure differential when said valve is open.

15. The method claim 12, wherein said first mass spectrometer module comprises a plurality of first ionization sources.

16. The method claim 15, wherein said plurality of first ionization sources is a plurality of vacuum ultraviolet light sources; and wherein each of said plurality of vacuum ultraviolet light sources comprise:

a plasma cell for generating a plasma, the plasma cell comprising an anode, a cathode, a dielectric gap, and a window layer substantially transparent to at least a portion of vacuum ultraviolet light emitted by the plasma, the plasma cell being configured to contain a gas suitable for generating the plasma.

17. The method of claim 16, wherein said first mass spectrometer module further comprises a first array of ion traps, each ion trap in said first array including an ion trap chamber in fluid communication with a first ion trap aperture and a second ion trap aperture;

wherein said plurality of vacuum ultraviolet light sources are arranged in a second array; and wherein said first array of ion traps and said second array of vacuum ultraviolet light sources are arranged such that each ion trap in said first array is disposed across from a corresponding vacuum ultraviolet light source in said second array.

18. The method of claim 15, wherein said plurality of first ionization sources further comprise at least one micro channel plate.

19. The method of claim 12, further comprising:

selecting a second laser wavelength for generating said neutral sample of analyte from a target; and generating said neutral sample of analyte from said target using pulses of said second laser wavelength.

20. The method of claim 19, wherein said first mass spectrometer module comprises a plurality of first ionization sources.

* * * * *